(12) United States Patent
Halsell (10) Patent No.: US 7,142,862 B2
(45) Date of Patent: Nov. 28, 2006

(54) INTRA-SERVICE NUMBER PORTABILITY IN WIRELESS NETWORK

(75) Inventor: Victoria M. Halsell, Aurora, IL (US)

(73) Assignee: Lucent Technologies Inc, Murray Hill, NJ (US)

( * ) Notice: Subject to any disclaimer, the term of this patent is extended or adjusted under 35 U.S.C. 154(b) by 258 days.

(21) Appl. No.: 10/746,623

(22) Filed: Dec. 24, 2003

(65) Prior Publication Data

US 2005/0143075 A1 Jun. 30, 2005

(51) Int. Cl.
*H04Q 7/20* (2006.01)
*H04M 7/00* (2006.01)

(52) U.S. Cl. ............... 455/445; 455/426.1; 379/221.13
(58) Field of Classification Search ................ 455/417, 455/432.1, 432.2, 432.3, 433, 445, 458, 426.1; 379/221.13
See application file for complete search history.

(56) References Cited

U.S. PATENT DOCUMENTS

| | | | |
|---|---|---|---|
| 5,878,347 A * | 3/1999 | Joensuu et al. ............. | 455/445 |
| 6,226,517 B1 * | 5/2001 | Britt et al. .................. | 455/445 |
| 6,421,442 B1 * | 7/2002 | Slutsman et al. ...... | 379/221.13 |
| 2002/0052211 A1 * | 5/2002 | Kim et al. .................. | 455/445 |
| 2002/0155834 A1 * | 10/2002 | Olmstead et al. ........... | 455/445 |

* cited by examiner

*Primary Examiner*—Nick Corsaro
*Assistant Examiner*—Olivia M. Marsh (57) ABSTRACT

A method of relating a dialed number to a new mobile station in a wireless network is provided. The dialed number is associated with a first mobile switching center, the new mobile station is associated with a second mobile switching center, and wireless service to the first and second mobile switching centers is provided by a common wireless service provider. The method includes: receiving a return result from a first home location register without location information, querying a second home location register, receiving a return result from the second home location register including location information, and communicating temporary routing and location information to a switch associated with the calling party. In another embodiment, the method also includes: pausing an inter-service number portability query process within the first mobile switching center. In another embodiment, a wireless network for relating the dialed number to the new mobile station is provided.

18 Claims, 5 Drawing Sheets

INTRA-SERVICE NUMBER PORTABILITY IN WIRELESS NETWORK

BACKGROUND OF INVENTION

The invention generally relates to intra-service number portability (NP) in a wireless network and associated methods for delaying, and potentially avoiding, an inter-service NP query while one or more intra-service queries are performed to return routing and location information for a mobile called party in response to a telephone call and will be described with particular reference thereto. However, it is to be appreciated that the invention is also amenable to other applications.

As referred to herein, intra-service or intra-network NP refers to certain NP features provided within a wireless network infrastructure serviced by a single wireless service provider. In contrast, inter-service or inter-network NP refers to certain NP features provided across multiple wireless network infrastructures, where each wireless network infrastructure may be serviced by different wireless service providers.

As is commonly known, NP exists in landline telephone networks. Separately, home location register (HLR) query support exists in wireless networks. Currently, in one standard implementation of wireless NP, when a network home location register (HLR) is queried and returns an error in the query response, NP logic will proceed to launch an inter-service NP query to locate the subscriber for routing information identifying a ported MSC. Then, the ported MSC must perform an HLR query to determine location information associated with the subscriber's mobile station (MS). In another standard implementation, the home HLR query is bypassed and the NP query is launched directly.

In today's environment, wireless service providers may incorporate 2G (e.g., time division multiple access (TDMA), code division multiple access (CDMA)) and 3G (e.g., global system for mobile communications (GSM), universal mobile telecommunications system (UMTS)) subscribers and corresponding infrastructure (e.g., 2G and 3G MSCs, 2G and 3G HLRs, etc.) in the same wireless network as they migrate from 2G to 3G wireless communication architecture. However, when a subscriber upgrades from 2G to 3G, a new 3G MS is typically required and the new 3G MS typically requires wireless service through 3G MSCs and HLRs. In November 2003, the Federal Communications Commission (FCC) mandated that all wireless carriers support wireless NP. This opened the door for many 2G subscribers to reap the benefits of new and advanced 3G MSs, while keeping their same directory number (DN) by activating the NP feature associated with their wireless service. The problem is that if intra-network or intra-service porting has occurred, the service provider may have to query an NP database for routing information only to find out that the subscriber, while not recognized by the 2G HLR, is still in their network or service, but on a different (i.e., 3G) HLR. Currently, if the 2G HLR query fails, NP logic will launch a query to the NP database, usually costing the wireless service provider additional money for processing the call.

As can be appreciated from the foregoing, NP capabilities in wireless networks require repetitive NP queries for incoming calls to a ported subscriber. These repeated NP queries create an undesirable cost burden on wireless service providers associated with a ported subscriber's original DN. Thus, there is motivation for mechanisms addressing the above-referenced problems and others.

BRIEF SUMMARY OF INVENTION

In one aspect of the invention, a method of relating a dialed number to a new mobile station in a wireless network for an incoming call from a calling party using a calling party device to a called party using the new mobile station is provided. The dialed number is associated with a first mobile switching center, the new mobile station is associated with a second mobile switching center, and wireless service to the first and second mobile switching centers is provided by a common wireless service provider. The method includes: a) receiving a return result from a first home location register associated with the first mobile switching center in response to querying the first home location register for location information associated with the dialed number, wherein the return result does not include the location information, b) querying a second home location register associated with the second mobile switching center for location information associated with the dialed number, c) receiving a return result from the second home location register, wherein the return result includes the location information, wherein the location information is associated with the new mobile station, and d) communicating temporary routing and location information associated with the new mobile station to a switch associated with the calling party. In another embodiment, the method also includes: e) pausing an inter-service number portability query process within the first mobile switching center.

In another aspect of the invention, a method of relating a dialed number to a new mobile station in a wireless network for an incoming call from a calling party using a calling party device to a called party using the new mobile station is provided. The dialed number is associated with a first mobile switching center, the new mobile station is associated with a second mobile switching center, and wireless service to the first and second mobile switching centers is provided by a common wireless service provider. The method includes: a) pausing an inter-service number portability query process within the first mobile switching center, b) querying a home location register associated with the second mobile switching center for location information associated with the dialed number, c) receiving a return result from the home location register, wherein the return result includes the location information, wherein the location information is associated with the new mobile station, and d) communicating temporary routing and location information associated with the new mobile station to a switch associated with the calling party.

In still another aspect of the invention, a wireless network for relating a dialed number to a new mobile station for an incoming call from a calling party using a calling party device to a called party using the new mobile station is provided. Wireless service to the dialed number and the new mobile station is provided by a common wireless service provider. The wireless network includes: a first mobile switching center receiving the incoming call and including a location query logic and an intra-service number portability query logic, wherein the first mobile switching center is associated with the dialed number, a first home location register in communication with the location query logic, wherein the first home location register is associated with the dialed number, a second mobile switching center associated with the new mobile station, and a second home location register in communication with the intra-service number portability query logic, wherein the second home location register is associated with the new mobile station and the second mobile switching center. The intra-service number portability query logic queries the second home location register for location information associated with the dialed number. The second home location register provides a return result to the first mobile switching center, wherein the return result includes the location information and the location information is associated with the new mobile station. The first mobile switching center communicates temporary routing and location information to a switch associated with the calling party.

In another embodiment, the first mobile switching center also includes: an inter-service number portability query logic in communication with the intra-service number portability query logic and the wireless network also includes: a number portability database in communication with the inter-service number portability query logic. The inter-service number portability query logic is paused until the first and second home location registers provide return results in response to queries for location information associated with the dialed number that do not include the location information.

In yet another aspect of the invention, a wireless network for relating a dialed number to a new mobile station for an incoming call from a calling party using calling party device to a called party using the new mobile station is provided. Wireless service to the dialed number and the new mobile station is provided by a common wireless service provider. The wireless network includes: means for receiving a return result from a first home location register in response to querying the first home location register for location information associated with the dialed number, wherein the return result does not include the location information, means for querying a second home location register for location information associated with the mobile station, wherein the second home location register is associated with the dialed number and the new mobile station, means for receiving a return result from the second home location register, wherein the return result includes the location information, wherein the location information is associated with the new mobile station, and means for communicating temporary routing and location information associated with the mobile station to a switch associated with the calling party. In another embodiment, the wireless network also includes: means for pausing an inter-service number portability query process within the first mobile switching center.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

As can be appreciated from the foregoing, a mechanism is needed in an MSC to put NP logic in a hold state so that an NP database query is not launched until multiple HLRs associated with the wireless service provider have been queried. The wireless service provider avoids NP database query charges when an intra-service ported subscriber is located by one of these intra-network HLR queries. In general, an exemplary embodiment of one aspect of the invention provides routing query logic in a home MSC that enables two or more HLRs to be queried for routing information in response to a call to a mobile called party before an NP query to the NP database is executed. The NP query to the NP database may be put in a hold state or may simply be delayed until the two or more HLRs both return error messages in response to the queries requesting routing information.

An exemplary scenario implementing this process begins with an incoming call to mobile station A arriving at home MSC A. When the call arrives, call processing may enter into digit analysis and the routing query logic will be checked to determine if the NP feature is active. If the NP feature is active and set to launch NP queries after an initial HLR query for routing information has failed, a normal HLR query will be performed to a first HLR to locate the subscriber.

If the first HLR query fails, the routing query logic will check to see if the home MSC supports a dual HLR query option (i.e., an intra-service type of NP query). If the home MSC supports the dual HLR query option, the routing query logic will allow call processing to query the second HLR that is provisioned for routing information. This may also be referred to an intra-service NP query. The routing query logic, for example, may be required to simultaneously support dual HLR query responses as well (say from TDMA or GSM). The routing query logic may put a query to the NP database in a hold state or simply delay it until the first and second HLR queries both fail.

If the second HLR query fails, then the routing query logic will proceed with the query to the NP database to identify a ported MSC associated with the subscriber. However, if the second HLR query produces the routing information (i.e., temporary local directory number (TLDN)), then call processing will continue through normal handling without having to perform the query to the NP database. Thus, wireless service providers will be able to allow subscribers to port within their own network without having to incur additional costs associated with querying the NP database to identify the ported MSC.

Figure 1:
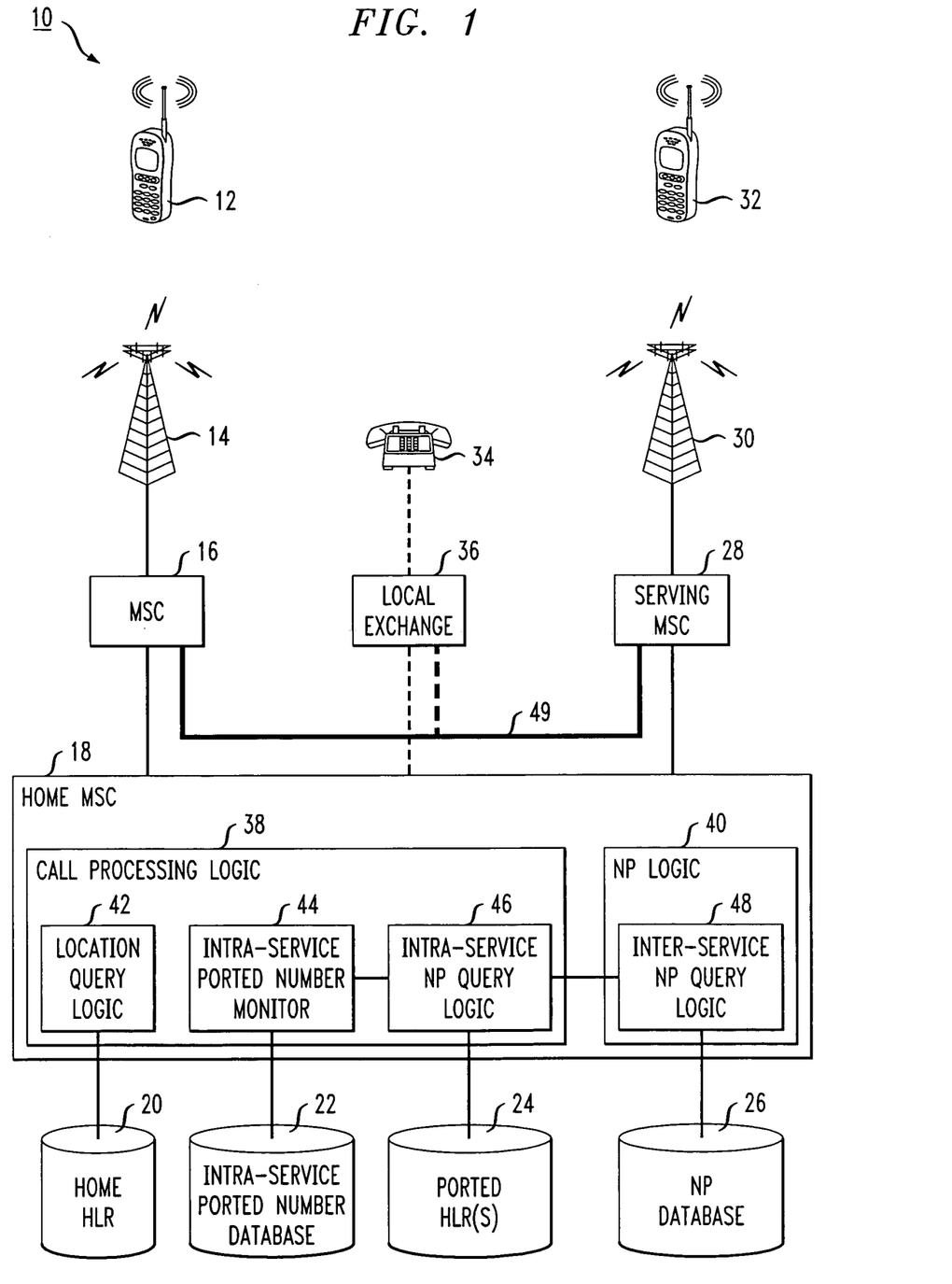
FIG. 1 is a block diagram of an exemplary telecommunication system providing an intra-service NP query feature.

With reference to FIG. 1, an exemplary telecommunication system 10 includes a first mobile station (MS) 12, a first base station (BS) 14, a first MSC 16, a home MSC 18, a home HLR 20, an intra-service ported number database 22, one or more ported HLRs 24, an NP database 26, a serving MSC 28, a second BS 30, and a second MS 32. The first MS 12, first BS 14, and first MSC 16 are associated with a calling party leg of a call from a wireless network. Alternatively, if the call is from a landline network, a landline telephone device 34 and a local exchange 36 are associated with the calling party leg of the call. In varying capacities, the other components identified are associated with a called party leg of the call. Note that the serving MSC 28 may be the new home or ported MSC if the second MS 32 is not roaming. If the second MS 32 is roaming the serving MSC 28 may be within the service provider's wireless network or in another wireless network served by another wireless service provider.

The home MSC 18 includes a call processing logic module 38 and an NP logic module 40. The call processing logic module 38 includes a location query logic 42, an intra-service ported number monitor 44, and an intra-service NP query logic 46. The NP logic module 40 includes an inter-service NP query logic 48. The voice trunk 49 provides a voice channel between the first MSC 16 or local exchange 36 and the serving MSC 28. It is understood that the above components may be implemented in hardware, software, or various combinations of hardware and software. Additionally, it is understood that the above components may be combined in any suitable manner in actual implementation.

In a first exemplary scenario, a call is initiated by a calling party using the first MS 12 or landline telephone device 34 to a called party using the second MS 32. The called party initially subscribed to wireless service from a wireless service provider for an original MS. The wireless service provider provided wireless service to the original MS via the home MSC 18. However, now the called party has subscribed to wireless service from the same wireless service provider for the second MS 32 (which, for example, is different from the original MS in that the original MS was a TDMA device and the second MS is a GSM device). In providing wireless service to the second MS 32, the wireless service provider associates the second MS 32 with a different home MSC than the original home MSC 18 in order to support, for example, GSM service. However, the subscriber has elected to retain the same DN and has activated an NP feature so that the original DN is ported to the second MS 32. Thus, wireless service provider must now port incoming calls to the called party from the original home MSC 18 to the new home MSC.

Under these circumstances, the new home MSC may be referred to as a ported MSC with respect to the original home MSC. The wireless service provider has stored information identifying the called party's activation of NP features to port incoming calls for the original DN to the second MS 32 in the intra-service ported number database 22. The stored information may simply identify the DN as a number that is ported to another MSC within the wireless service provider's network. Additionally, the stored information may include routing information identifying the ported MSC or any type of information identifying one or more HLRs that may be associated with the ported MSC. In other words, the database may associate the called party's DN and corresponding home MSC 18 with the ported MSC or an HLR associated with the ported MSC. The database may be a centralized database accessible to multiple MSCs in the service area supported by the wireless service provider. Alternatively, the database may be co-located within one or more MSCs. Even with co-located databases, sharing database information with MSCs not having a local database is contemplated.

The scenario being described is common in wireless service providers that provide two or more of TDMA, CDMA, GSM, and UMTS wireless services and offer subscribers the option of keeping the same DN if they switch to a different wireless communication protocol. A common example of this is where a subscriber with a TDMA MS switches to a GSM MS and elects to keep the same DN. The wireless service provider must port incoming calls from a TDMA MSC associated with the original TDMA MS to a GSM MSC supporting the GSM MS.

Given the initial conditions described above, the scenario begins when the call is routed by the incoming call leg to the home MSC 18. The location query logic 42 communicates with the home HLR 20 to request a location for the original MS. However, since the subscriber is now using the second MS 32 instead of the original MS, for example, because the subscriber has upgraded from TDMA service to GSM service, an error message is returned by the home HLR 20. At this point, the traditional NP query process is delayed, paused, or placed in a hold state by the call processing logic 38. The intra-service ported number monitor 44 queries the intra-service ported number database 22 to determine if the called party has ported to another MSC within the wireless service provider's network. The intra-service ported number database 22 returns a message to the intra-service ported number monitor 44 identifying the incoming call as an intra-service ported number and routing information to the ported MSC. The intra-service ported number monitor 44 communicates this information to the intra-service NP query logic 46.

The intra-service NP query logic 46 uses the ported MSC routing information to identify a ported HLR 24 associated with the ported MSC and queries the ported HLR for location information associated with the second MS 32. The ported HLR 24 returns location and routing information based on the current geographic location of the second MS 32. The home MSC 18 uses the location and routing information to forward the incoming call to the second MS 32 and returns temporary routing information (e.g., temporary location DN (TLDN)) to the calling party switch (i.e., the first MSC 16 or the local exchange 36, depending on whether the first MS 12 or the landline telephone device 34 was used to originate the call).

The first scenario may be adapted if the intra-service ported number database 22 does not include routing information to the ported MSC and the wireless service provider may know one or more HLRs that support intra-service NP. Thus, the intra-service NP query logic 46 would simply use a query loop to query each HLR that may have location information associated with the second MS 32 until location information is returned in a response message. Otherwise, the intra-service NP query logic 46 may use a query loop to query each HLR (other than the home HLR) within wireless service provider's wireless network until location information is returned in a response message.

In a second exemplary scenario, the same initial conditions as described for the first scenario apply except that the wireless network knows that the called party's telephone number is ported without checking the home HLR 20. In this scenario, the call is routed by the incoming call leg to the home MSC 18 and the traditional NP query process is delayed, paused, or placed in a hold state by the NP routing and location logic 42. Then, the intra-service ported number monitor 44, intra-service ported number database 22, intra-service NP query logic 46, and ported HLR(s) 24 operate in the same manner as described for the first scenario.

The second scenario may be adapted if the wireless service provider does not know the called party's telephone number is ported by simply including the home HLR 20 in the query loop operated by the intra-service NP query logic 46 as discussed above in the adapted version of the first scenario. Of course in this adapted second scenario, the intra-service NP query logic 46 is also in communication with the home HLR 20.

As shown in the drawing, the inter-service NP query logic 48 is in communication with the intra-service NP query logic 46 and the NP database 26. If the intra-service NP query logic 46 does not receive location information for the second MS 32 from its intra-service queries, the traditional NP query process is initiated by the intra-service NP query logic 46 communicating with the inter-service NP query logic 48.

Ultimately, if the subscriber's account is active, if the second MS 32 is currently powered on, and if location information for the second MS 32 is obtained, the incoming call is forwarded to the second MS 32 and, when the second MS 32 answers the call, the voice trunk 49 is connected from the incoming call leg to the second MS 32 via the serving MSC 28 and second BS 30.

Figure 2:
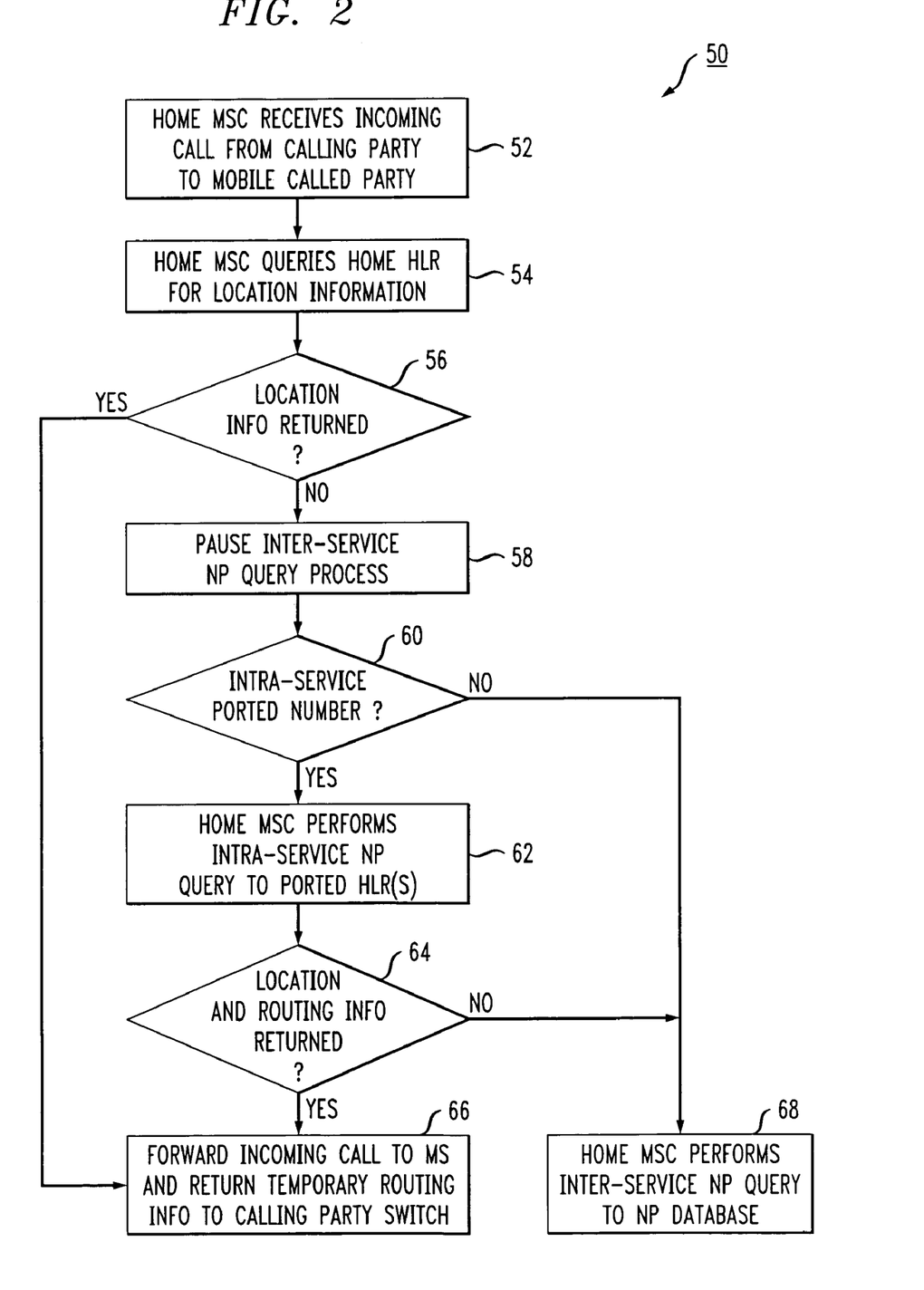
FIG. 2 is a flowchart of an exemplary process for a wireless service provider to avoid NP queries for subscribers ported within the service provider's wireless network.

With reference to FIG. 2, an exemplary process 50 for a wireless service provider to avoid NP queries for subscribers ported within the service provider's wireless network begins at step 52 when a home MSC receives an incoming call from a calling party to a mobile called party. At step 54, the home MSC queries a home HLR for location information. Next, the process determines whether location information is returned by the home HLR (step 56). If location information is not returned by the home HLR, at step 58 the traditional inter-service NP query process is paused. Next, the process determines if the incoming call is to an intra-service ported number (step 60). If the call is to an intra-service ported number, at step 62 the home MSC performs an intra-service NP query to one or more ported HLRs within the wireless service provider's network. Next, the process determines whether location and routing information is returned by one of the ported HLR (step 64). If location and routing information is returned, at step 66, the home MSC forwards the incoming call to an MS associated with the mobile called party and returns temporary routing information (e.g., TLDN) to a switch (e.g., MSC or local exchange) associated with the calling party.

At step 56, if location information is returned by the home HLR, the process advances to step 66 and the home MSC forwards the incoming call to the MS associated with the mobile called party and returns temporary routing information to the switch associated with the calling party.

At step 60, if the call is not to an intra-service ported number, the process advances to step 68 and the home MSC performs an inter-service NP query to the NP database. Similarly, at step 64, if location and routing information is not returned by one of the ported HLRs, the process advances to step 68 and the home MSC performs an inter-service NP query to the NP database.

Figure 3:
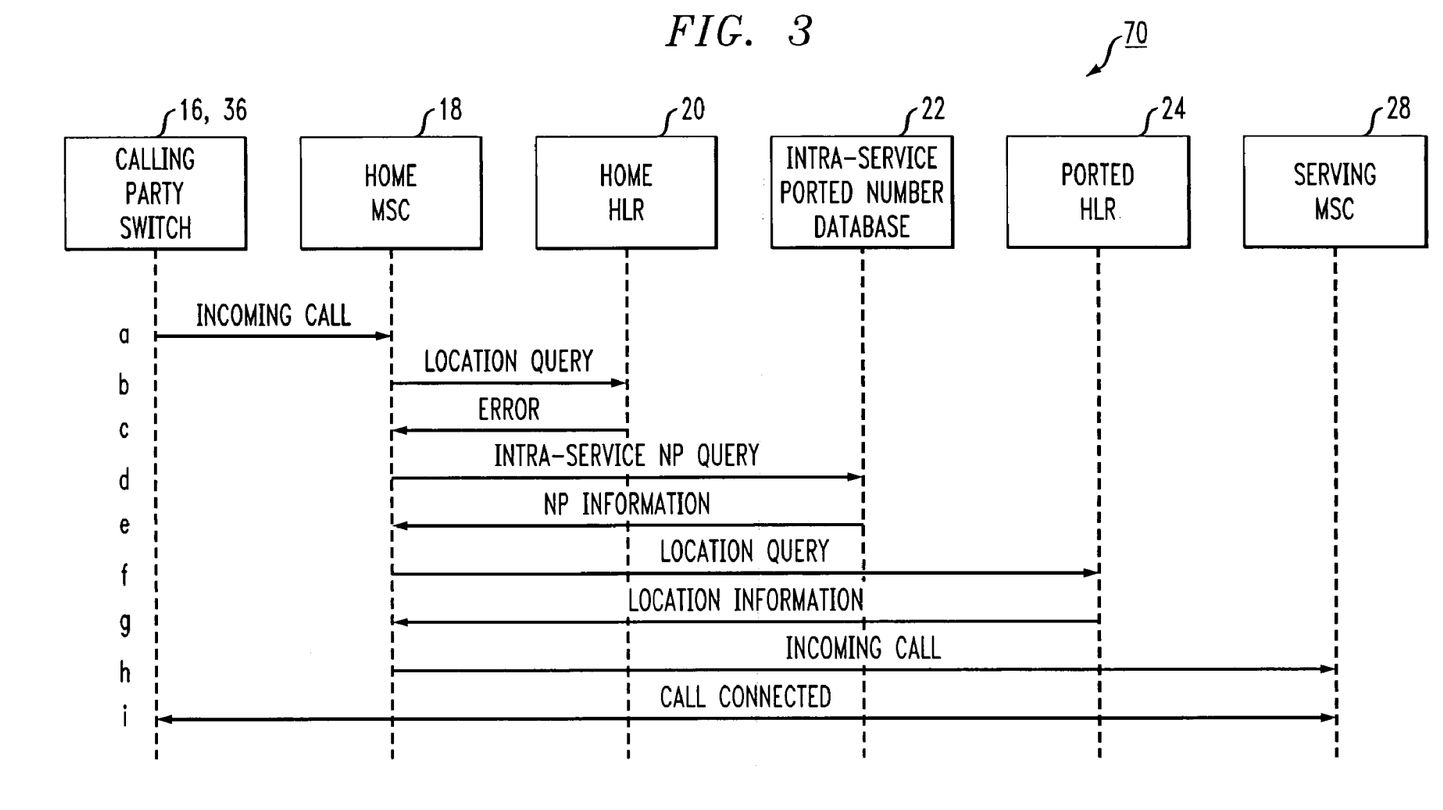
FIG. 3 is a call flow diagram of an exemplary process for a wireless service provider to avoid NP queries for subscribers ported within the service provider's wireless network.

With reference to FIG. 3, a call flow diagram 70 provides another view of the scenario described above in conjunction with FIG. 2 where the wireless service provider avoids an NP query for a subscriber ported within the service provider's wireless network. The call flow begins at line a, where the calling party switch (i.e., first MSC 16 or local exchange 36) communicates an incoming call to the DN associated with the second MS 32 to the home MSC 18. At line b, the home MSC 18 sends a location query message to the home HLR 20 for location information associated with the DN. In response, the home HLR 20 returns an error message to the home MSC 18 (line c). At line d, the home MSC 18 sends an intra-service NP query message to the intra-service ported number database 22. In response, the intra-service ported number database 22 returns an NP information message to the home MSC 18 (line e). The NP information message identifies the DN as an intra-service ported number and provides routing and other information to identify the ported HLR. At line f, the home MSC 18 sends a location query message to the ported HLR 24 for location information associated with the DN. In response, the ported HLR 24 returns a location information message to the home MSC 18 (line g).

Having located the second MS 32, the home MSC 18 forwards the incoming call to the serving MSC 28 (line h). This rings the second MS 32. When the incoming call is answered, the call is connected between the calling party switch and the serving MSC 28 via the voice trunk 49 (line i).

Figure 4:
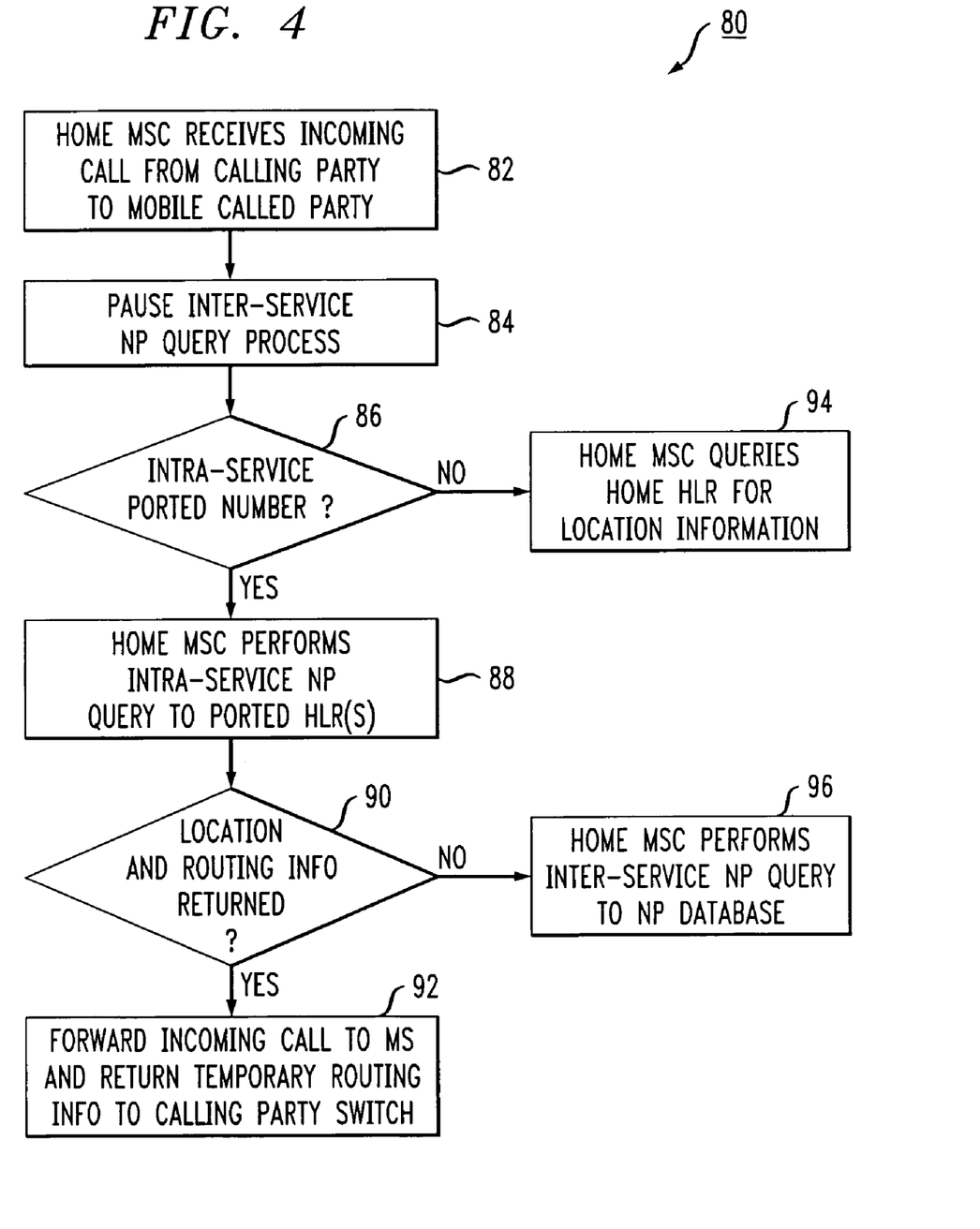
FIG. 4 is a flowchart of another exemplary process for a wireless service provider to avoid NP queries for subscribers ported within the service provider's wireless network.

With reference to FIG. 4, another exemplary process 80 for a wireless service provider to avoid NP queries for subscribers ported within the service provider's wireless network begins at step 82 when a home MSC receives an incoming call from a calling party to a mobile called party. At step 84, the traditional inter-service NP query process is paused. Next, the process determines if the incoming call is to an intra-service ported number (step 86). If the call is to an intra-service ported number, at step 88 the home MSC performs an intra-service NP query to one or more ported HLRs within the wireless service provider's network. Next, the process determines whether location and routing information is returned by one of the ported HLR (step 90). If location and routing information is returned, at step 92, the home MSC forwards the incoming call to an MS associated with the mobile called party and returns temporary routing information (e.g., TLDN) to a switch (e.g., MSC or local exchange) associated with the calling party.

At step 86, if the call is not to an intra-service ported number, the process advances to step 94 and the home MSC queries a home HLR for location information. Similarly, at step 90, if location and routing information is not returned by one of the ported HLRs, the process advances to step 96 and the home MSC performs an inter-service NP query to the NP database.

Figure 5:
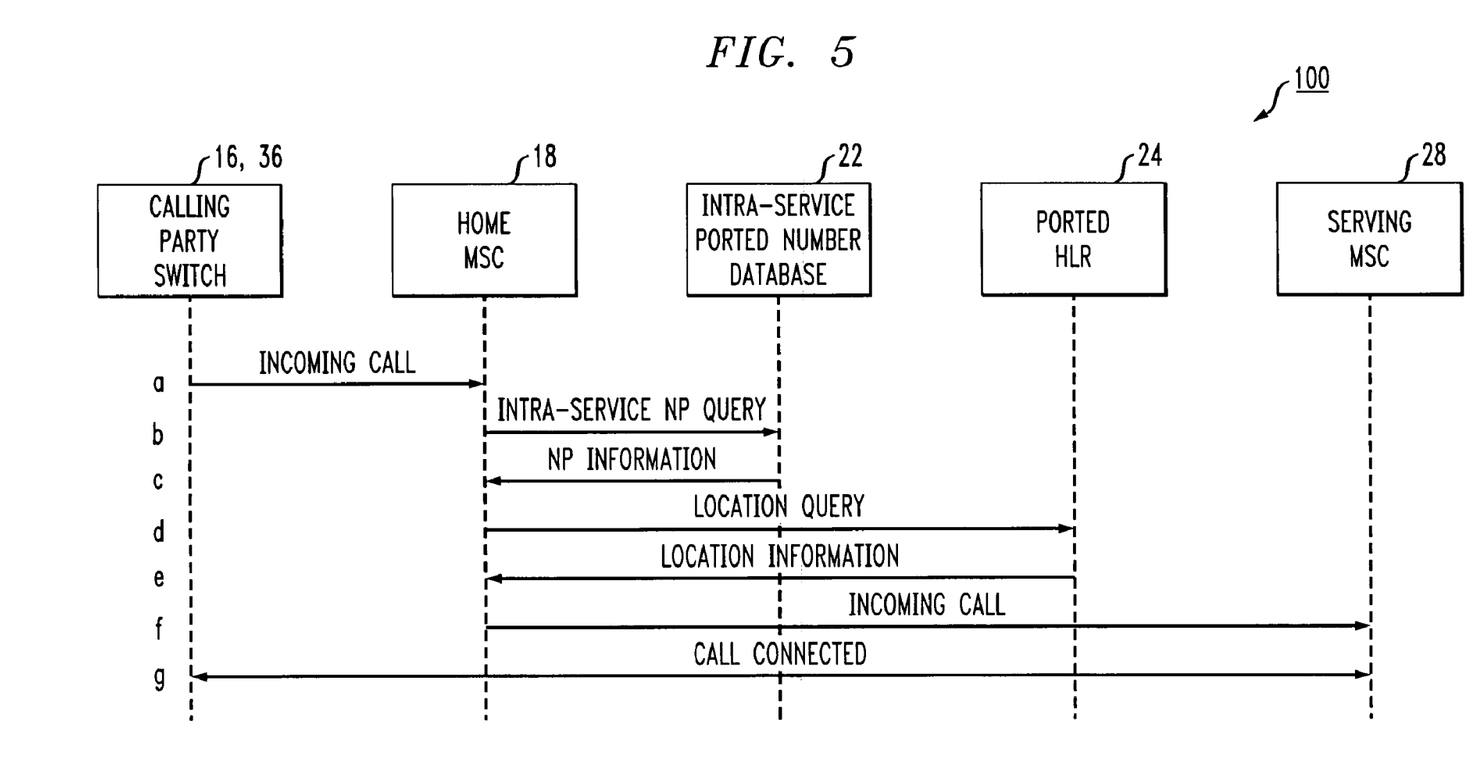
FIG. 5 is a call flow diagram of another exemplary process for a wireless service provider to avoid NP queries for subscribers ported within the service provider's wireless network.

With reference to FIG. 5, a call flow diagram provides another view of the scenario described above in conjunction with FIG. 4 where the wireless service provider avoids an NP query for a subscriber ported within the service provider's wireless network. The call flow begins at line a, where the calling party switch (i.e., first MSC 16 or local exchange 36) communicates an incoming call to the DN associated with the second MS 32 to the home MSC 18. At line b, the home MSC 18 sends an intra-service NP query message to the intra-service ported number database 22. In response, the intra-service ported number database 22 returns an NP information message to the home MSC 18 (line c). The NP information message identifies the DN as an intra-service ported number and provides routing and other information to identify the ported HLR. At line d, the home MSC 18 sends a location query message to the ported HLR 24 for location information associated with the DN. In response, the ported HLR 24 returns a location information message to the home MSC 18 (line e).

Having located the second MS 32, the home MSC 18 forwards the incoming call to the serving MSC 28 (line f). This rings the second MS 32. When the incoming call is answered, the call is connected between the calling party switch and the serving MSC 28 via the voice trunk 49 (line g).

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. A method of relating a dialed number to a new mobile station in a wireless network for an incoming call from a calling party using a calling party device to a called party using the new mobile station, wherein the dialed number is associated with a first mobile switching center, the new mobile station is associated with a second mobile switching center, and wireless service to the first and second mobile switching centers is provided by a common wireless service provider, the method including the steps:
   a) receiving a return result from a first home location register associated with the first mobile switching center in response to querying the first home location register for location information associated with the dialed number, wherein the return result does not include the location information;
   b) querying a second home location register associated with the second mobile switching center for location information associated with the dialed number;
   c) receiving a return result from the second home location register, wherein the return result includes the location information, wherein the location information is associated with the new mobile station;
   d) communicating temporary routing and location information associated with the new mobile station to a switch associated with the calling party; and
   between steps a) and b), further including the step:
   e) pausing an inter-service number portability query process within the first mobile switching center.

2. A method of relating a dialed number to a new mobile station in a wireless network for an incoming call from a calling party using a calling party device to a called party using the new mobile station, wherein the dialed number is associated with a first mobile switching center, the new mobile station is associated with a second mobile switching center, and wireless service to the first and second mobile switching centers is provided by a common wireless service provider, the method including the steps:
   a) receiving a return result from a first home location register associated with the first mobile switching center in response to querying the first home location register for location information associated with the dialed number, wherein the return result does not include the location information;
   b) querying a second home location register associated with the second mobile switching center for location information associated with the dialed number;
   c) receiving a return result from the second home location register, wherein the return result includes the location information, wherein the location information is associated with the new mobile station; and
   d) communicating temporary routing and location information associated with the new mobile station to a switch associated with the calling party;

wherein the new mobile station is a 3G mobile station and the first mobile switching center is a 2G mobile switching center.

3. The method set forth in claim 2 wherein the second mobile switching center is a 3G mobile switching center.

4. The method set forth in claim 1 wherein the first mobile switching center is a type selected from the group of a TDMA type, a CDMA type, a GSM type, and a UMTS type.

5. The method set forth in claim 4 wherein the second mobile switching center is a type selected from the group of a TDMA type, a CDMA type, a GSM type, and a UMTS type, wherein the second mobile switching center is a different type than the first mobile switching and the new mobile station is the same type as the second mobile switching center.

6. A method of relating a dialed number to a new mobile station in a wireless network for an incoming call from a calling party using a calling party device to a called party using the new mobile station, wherein the dialed number is associated with a first mobile switching center, the new mobile station is associated with a second mobile switching center, and wireless service to the first and second mobile switching centers is provided by a common wireless service provider, the method including the steps:
   a) receiving a return result from a first home location register associated with the first mobile switching center in response to querying the first home location register for location information associated with the dialed number, wherein the return result does not include the location information;
   b) querying a second home location register associated with the second mobile switching center for location information associated with the dialed number;
   c) receiving a return result from the second home location register, wherein the return result includes the location information, wherein the location information is associated with the new mobile station;
   d) communicating temporary routing and location information associated with the new mobile station to a switch associated with the calling party; and
   between steps a) and b), further including the step:
   e) determining the dialed number is an intra-service ported number and identifying the second mobile switching center as a ported mobile switching center.

7. A method of relating a dialed number to a new mobile station in a wireless network for an incoming call from a calling party using a calling party device to a called party using the new mobile station, wherein the dialed number is associated with a first mobile switching center, the new mobile station is associated with a second mobile switching center, and wireless service to the first and second mobile switching centers is provided by a common wireless service provider, the method including the steps: a) pausing an inter-service number portability query process within the first mobile switching center;
   b) querying a home location register associated with the second mobile switching center for location information associated with the dialed number;
   c) receiving a return result from the home location register, wherein the return result includes the location information, wherein the location information is associated with the new mobile station; and
   d) communicating temporary routing and location information associated with the new mobile station to a switch associated with the calling party.

8. The method set forth in claim 7, between steps a) and b), further including the step:
   e) determining the dialed number is an intra-service ported number and identifying the second mobile switching center as a ported mobile switching center.

9. A wireless network for relating a dialed number to a new mobile station for an incoming call from a calling party using a calling party device to a called party using the new mobile station, wherein wireless service to the dialed number and the new mobile station is provided by a common wireless service provider, the wireless network including:
   a first mobile switching center receiving the incoming call and including a location query logic and an intra-service number portability query logic, wherein the first mobile switching center is associated with the dialed number;
   a first home location register in communication with the location query logic, wherein the first home location register is associated with the dialed number;
   a second mobile switching center associated with the new mobile station; and
   a second home location register in communication with the intra-service number portability query logic, wherein the second home location register is associated with the new mobile station and the second mobile switching center;
   wherein the intra-service number portability query logic queries the second home location register for location information associated with the dialed number;
   wherein the second home location register provides a return result to the first mobile switching center, wherein the return result includes the location information and the location information is associated with the new mobile station; and
   wherein the first mobile switching center communicates temporary routing and location information to a switch associated with the calling party.

10. The wireless network set forth in claim 9 wherein the location query logic queries the first home location register for location information associated with the dialed number, wherein the first home location register provides a return result to the first mobile switching center, wherein the return result does not include the location information.

11. The wireless network set forth in claim 9, the first mobile switching center further including:
   an intra-service ported number monitor logic in communication with the intra-service number portability query logic; and
   the wireless network further including:
   an intra-service ported number database in communication with the intra-service ported number monitor logic;
   wherein the intra-service ported number monitor logic queries the intra-service ported number database to determine if the dialed number is an intra-service ported number and, if so, to identify the second home location register in relation to the intra-service ported number.

12. The wireless network set forth in claim 9, the first mobile switching center further including:
   an inter-service number portability query logic in communication with the intra-service number portability query logic; and
   the wireless network further including:
   a number portability database in communication with the inter-service number portability query logic;
   wherein the inter-service number portability query logic is paused until the first and second home location registers provide return results in response to queries for location information associated with the dialed number that do not include the location information.

13. The wireless network set forth in claim 9 wherein the mobile station is a 3G mobile station and the first mobile switching center is a 2G mobile switching center.

14. The wireless network set forth in claim 13 wherein the second mobile switching center is a 3G mobile switching center.

15. The wireless network set forth in claim 9 wherein the first mobile switching center is a type selected from the group of a TDMA type, a CDMA type, a GSM type, and a UMTS type.

16. The wireless network set forth in claim 15 wherein the second mobile switching center is a different type than the first mobile switching center and is a type selected from the group of a TDMA type, a CDMA type, a GSM type, and a UMTS type, wherein the mobile station is the same type as the second mobile switching center.

17. A wireless network for relating a dialed number to a new mobile station for an incoming call from a calling party using calling party device to a called party using the new mobile station, wherein wireless service to the dialed number and the new mobile station is provided by a common wireless service provider, the wireless network including:
   means for receiving a return result from a first home location register in response to querying the first home location register for location information associated with the dialed number, wherein the return result does not include the location information;
   means for querying a second home location register for location information associated with the mobile station, wherein the second home location register is associated with the dialed number and the new mobile station;
   means for receiving a return result from the second home location register, wherein the return result includes the location information, wherein the location information is associated with the new mobile station;
   means for communicating temporary routing and location information associated with the mobile station to a switch associated with the calling party; and
   means for pausing an inter-service number portability query process within the first mobile switching center.

18. A wireless network for relating a dialed number to a new mobile station for an incoming call from a calling party using calling party device to a called party using the new mobile station, wherein wireless service to the dialed number and the new mobile station is provided by a common wireless service provider, the wireless network including:
   means for receiving a return result from a first home location register in response to querying the first home location register for location information associated with the dialed number, wherein the return result does not include the location information;
   means for querying a second home location register for location information associated with the mobile station, wherein the second home location register is associated with the dialed number and the new mobile station;
   means for receiving a return result from the second home location register, wherein the return result includes the location information, wherein the location information is associated with the new mobile station;
   means for communicating temporary routing and location information associated with the mobile station to a switch associated with the calling party; and
   means for determining the dialed number is an intra-service ported number and identifying the second mobile switching center as a ported mobile switching center.

* * * * *